United States Patent [19]

Mann et al.

[11] 4,135,236
[45] Jan. 16, 1979

[54] DC-TO-DC CHOPPER CIRCUIT

[75] Inventors: Stanley L. Mann, New Berlin; Charles E. Rettig, Brookfield, both of Wis.

[73] Assignee: Litton Industrial Products Inc., Milwaukee, Wis.

[21] Appl. No.: 833,538

[22] Filed: Sep. 15, 1977

[51] Int. Cl.² .................................................. H02M 3/315
[52] U.S. Cl. .............................. 363/124; 323/DIG. 1; 307/252 M; 363/135
[58] Field of Search ................... 307/252 M; 363/124, 363/135; 323/DIG. 1

[56] References Cited

U.S. PATENT DOCUMENTS

| | | | |
|---|---|---|---|
| 3,614,586 | 10/1971 | King | 363/124 X |
| 3,913,002 | 10/1975 | Steigerwald et al. | 363/124 X |
| 3,919,622 | 11/1975 | AlNema et al. | 363/135 |

FOREIGN PATENT DOCUMENTS

| | | | |
|---|---|---|---|
| 1946279 | 10/1970 | Fed. Rep. of Germany | 363/124 |
| 446 | 9/1965 | Japan | 363/124 |
| 1051629 | 12/1966 | United Kingdom | 363/124 |

*Primary Examiner*—William M. Shoop

[57] ABSTRACT

A DC-to-DC chopper circuit has a first switch that is selectively actuated to supply load current to a regulated bus and bus voltage to a resonating circuit which increases the applied voltage to approximately twice the value of the bus voltage, and a second switch selectively actuated so that the current on the bus flows through the resonating circuit discharging the increased voltage stored therein to zero whereupon a freewheeling circuit permits the established current to freewheel until the next chopper cycle.

7 Claims, 3 Drawing Figures

DC-TO-DC CHOPPER CIRCUIT

BACKGROUND OF THE INVENTION

Variable frequency inverter power supplies have been improved by the use of current source power supplies. For example, see U.S. Letters Pat. Nos. 3,863,121 granted Jan. 28, 1975 and assigned to the same assignee as the present invention. Inverters have been built using a phase-controlled rectifier for control purposes. This is a simple, rugged control system that can tolerate abuse and yet continue operation when supplied from alternating current (AC) power mains. This is because the phase-control rectifier is commutated by the reversal of the applied AC voltage. If a misfire were to occur, the AC voltage continues reversing in polarity giving the control circuit another opportunity to fire on the next cycle. This can be readily accomplished with the proper sizing of power circuit elements.

Inverters can also be operated from direct current (DC) power mains by use of a chopper. As its name implies, a chopper provides an adjustable magnitude DC voltage by repetitively applying the constant voltage from the DC power main for adjustable time intervals so that over a long period the average value of the direct current is at a desired level. However, with a chopper as the controlling element, there is no source of energy for commutation like there is with the phase-controlled rectifier. The chopper depends upon stored energy to turn itself off. If for some reason a misfire occurs, or the stored energy is not enough to turn the chopper off, there is no second chance to commutate as there is with the phase-controlled rectifier. Yet it is desirable to use a DC-to-DC chopper to regulate the current in a current-source inverter. This gives the capability of producing output frequencies much higher than the 120 to 150 Hz limit when a phase-controlled rectifier is the current regulator.

OBJECTS OF THE INVENTION

Accordingly, it is an object of the invention to provide a new and improved DC-to-DC chopper circuit.

It is an object of the invention to provide a DC-to-DC chopper circuit to control output current from the circuit.

It is an object of the invention to provide a DC-to-DC SCR chopper circuit to control current supplied to a DC link choke for a regulated output.

SUMMARY OF THE INVENTION

Briefly, in accordance with one embodiment of the invention, a new and improved DC-to-DC chopper circuit is provided having a first switch means periodically connecting a source of DC voltage to a DC output bus, a resonating circuit means responsive to the first switch means applying the DC voltage at a first voltage level and increasing the DC voltage from the first voltage level to a determinable second voltage level, a second switch means periodically connecting the resonating circuit means at the second voltage level to the DC output bus so that the electrical continuity of the first switch means is interrupted and the second voltage level decreases to a zero voltage potential, and freewheeling means responsive to the resonating circuit means reaching the zero voltage potential and established a freewheeling current in the output bus; the established freewheeling current continuing until the electrical continuity of the second switch means and the freewheeling means are interrupted by the next periodic cycle of the first switch means.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

DESCRIPTION OF THE INVENTION

Figure 1:
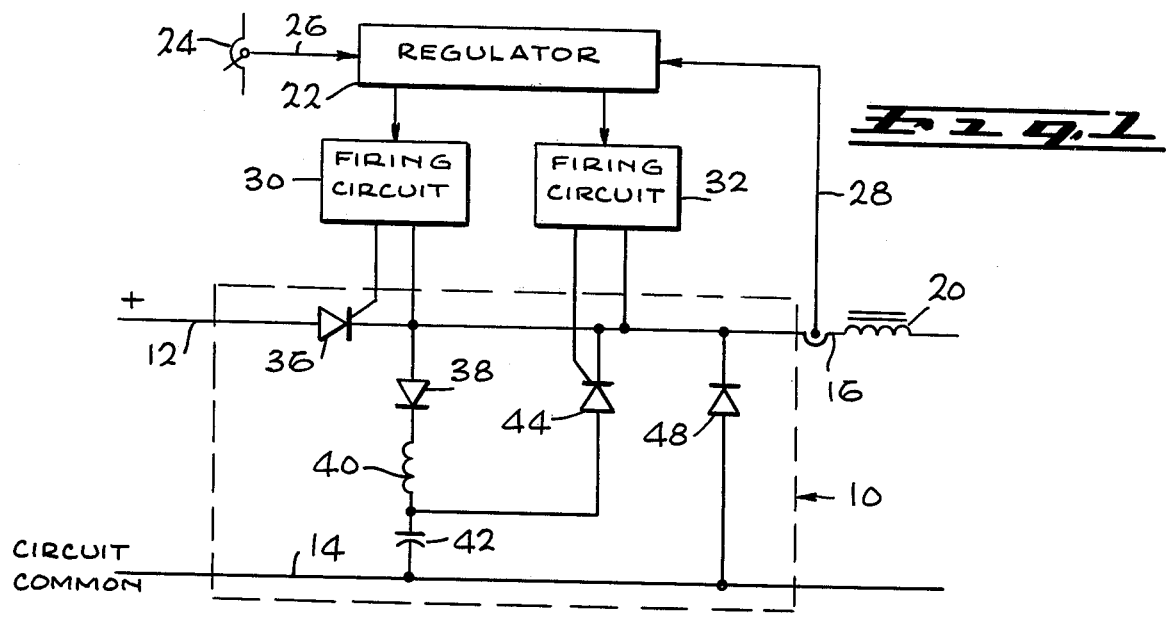
FIG. 1 is a schematic diagram of one DC-to-DC chopper circuit of the invention and a block diagram of one chopper control circuit with which the invention can find use.

Referring to FIG. 1, the DC-to-DC chopper circuit 10 of the invention operates from an unregulated DC bus having an electrically positive input conductor 12 and a circuit common or negative conductor 14. The chopper 10 of the invention can be considered as an on-off, solid state switch with a regulated DC output to a DC link choke 20 equal either to the unregulated DC voltage supplied to the chopper or to zero. However, the chopper is operated to switch at a relatively rapid rate, e.g. 600 Hz, so that the DC link choke 20 filters the DC output of the chopper to a relatively smooth DC level. It is contemplated that at least one such regulated output of the chopper 10 can be a unidirectional output such as a DC current. The smoothed and unidirectional output of the DC choke 20 can be delivered, for example but not shown, to an inverter where it is switched from phase to phase at a desired frequency and supplied to a load such as an AC motor load.

The chopper circuit 10 is controlled by a regulator 22 that compares a current reference signal from potentiometer 24 supplied through conductor 26 with a feedback signal, such as a current feedback signal, supplied through conductor 28 which reflects the regulated output of the chopper on positive output conductor 16. The resulting comparator waveform generated by the regulator 22 controls the initiation of silicon controlled rectifier (SCR) firing circuits 30 and 32.

A main SCR 36 draws unregulated DC power from positive input conductor 12 when the firing circuit 30 gates or turns on the main SCR. SCR 36 provides the current output through positive output conductor 16 to DC link choke 20. The chopper circuit 10 derives its stored energy from a resonating circuit including a charging diode 38 and reactor circuit; the reactor circuit consists of inductor 40 and capacitor 42 that are connected in series across the positive conductor 16 and circuit common 14 with the anode of diode 38 at the same electrical potential as the cathode of main SCR 36. The charging diode 38 applies voltage from the positive conductor 12, when main SCR 36 is gated on, to the reactor circuit that resonates in a conventional manner and increases the applied voltage on capacitor 40 to approximately twice the supplied unregulated DC voltage. The application of a step voltage which is equal to the applied unregulated bus voltage to the inductor 40 and capacitor 42 results in this increase in the capacitor voltage to twice that supplied. This voltage is trapped on the capacitor 42 when the charging diode 38 becomes reverse biased and stops conducting.

The main SCR 36 will continue to provide an output current to the DC link choke 20 until the main SCR is returned to an off or nonconducting mode. At that time, firing circuit 32 turns on a commutating SCR 44. SCR 44 is connected into the chopper circuit 10 with its anode intermediate inductor 40 and capacitor 42 and its cathode at the same potential as the cathode of the main SCR 36. Commutating SCR 44 applies the stored voltage of capacitor 42 to the main SCR 36 in a reverse polarity for a determinable period of time to reverse bias the main SCR into an off or nonconducting mode. Since the current flowing in the DC link choke 20 cannot stop instantaneously, it continues to flow through capacitor 42 and SCR 44 until the capacitor is discharged. At this point, a freewheeling diode 48 becomes forward biased and begins to conduct, allowing the DC current to continue to flow through the DC link choke 20. The freewheeling diode 48 is connected across conductors 14 and 16 with its cathode at the same potential as the cathodes of the main SCR 36 and commutating SCR 44.

This process is repeated at a repetition rate determined by the regulator 22. When the main SCR 36 is turned on, the current supplied by the main SCR to the load will increase to the level that was flowing in the freewheeling path and the charging diode 38 begins conducting, while the commutating SCR 44 and freewheeling diode 48 are driven into a nonconducting mode.

The actual commutation ability of the stored energy is determined by the amount that the captured or stored voltage of capacitor 42 exceeds the unregulated bus voltage delivered to the chopper circuit 10. This is the amount of reverse voltage that is available to be applied to the main SCR 36. To reverse bias SCR 36 into a nonconducting mode, reverse voltage must be applied for a minimum length of time, $t_q$, which is a known constant for a selected SCR. The time that reverse voltage, $t_{rev}$, is applied is determined by:

$$t_{rev} = C\Delta V/I \tag{1}$$

where
C = capacitance of capacitor 42,
$\Delta V$ = difference between capacitor voltage and applied bus voltage, and
I = current flowing from the chopper circuit 10 at the time the main SCR 36 is turned off.
When $t_{rev}$ is equal to or greater than $t_q$, main SCR will be turned off. Therefore, the current that can be commutated can be written as:

$$I = C\Delta V/t_{rev} \tag{2}$$

$$t_{rev} = \geq t_q \tag{3}$$

$$I = \leq C\Delta V/t_q = K\Delta V \tag{4}$$

Thus the allowed current is directly proportional to the voltage difference between charged capacitor 42 and the unregulated DC bus.

This difference can be predicted before the capacitor 42 is charged by determining the losses in the resonating circuit; for example, by taking 95% of the applied DC bus voltage since the capacitor will swing to about 195% of the applied voltage. This is also the same as the offstate voltage of the main SCR 36 before firing. After charging the capacitor, it can be seen that the difference voltage between the capacitor and the unregulated DC bus is equal to the off-state voltage of the commutating SCR 44.

Figure 2:
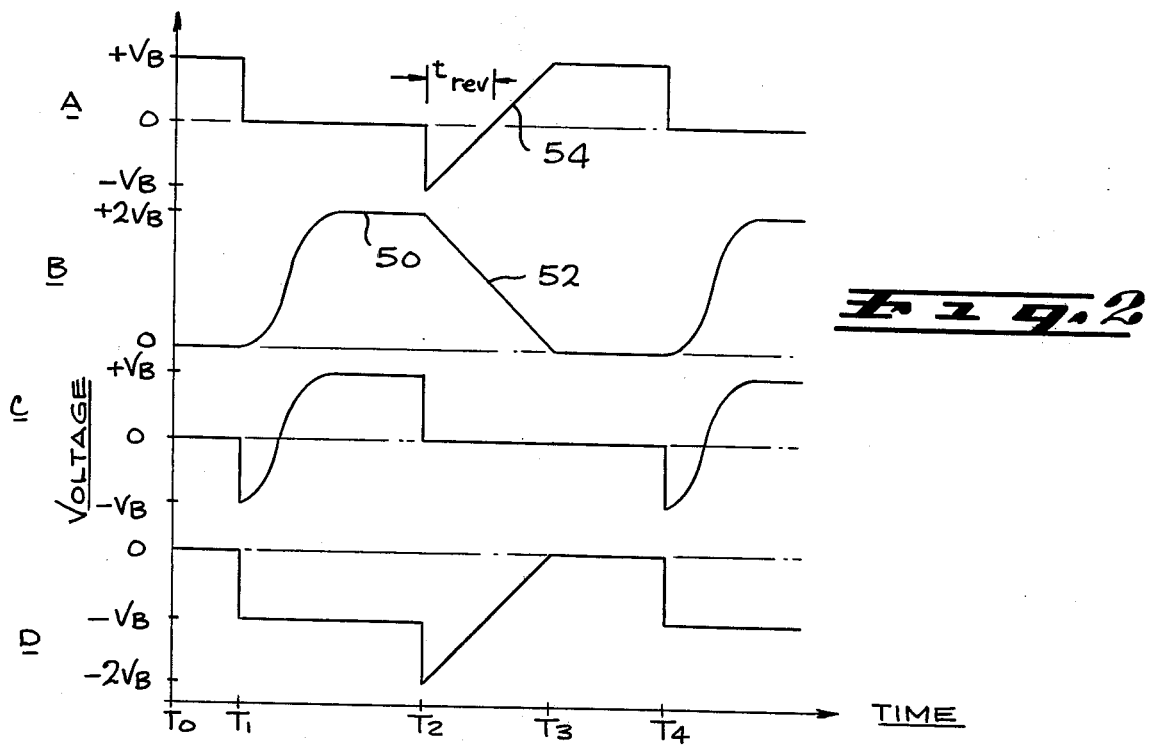
FIG. 2 is a graph of voltage waveforms produced by selected components of the chopper circuit of FIG. 1.

Operatively, the chopper circuit 10 of FIG. 1 can be described in conjunction with the sample waveforms of FIG. 2. The waveforms of FIG. 2A, 2B, 2C, and 2D show, respectively, the voltage across main SCR 36, capacitor 42, the anode of commutating SCR 44, and freewheeling diode 48, all of which are produced by the chopper circuit of the invention during a cycle of the process as described hereinbefore. In FIG. 2A, the main SCR 36 has an applied positive electrical potential that is equal to the voltage of the unregulated DC bus ($+V_B$). The main SCR 36 is in the off or nonconducting mode at time $T_o$. Since the main SCR is not turned on at $T_o$, there is no applied voltage on capacitor 42 and commutating SCR 44 as shown by FIGS. 2B and 2C, respectively. Similarly, the freewheeling diode 48 at FIG. 2D is at zero voltage potential although it is conducting in the freewheeling mode as described hereinbefore. At time $T_1$, the regulator 22 of FIG. 1 signals for the turn on of the chopper. Main SCR 36 is gated on and goes to zero potential in its conducting mode. This permits the capacitor 42 at FIG. 2B to experience the sinusoidal increase in the capacitor voltage to approximately twice the applied unregulated DC bus ($+2V_B$). The anode of the commutating SCR 44 sees the sinusoidal increase in voltage on capacitor 42 as a related increase in applied voltage that changes the applied potential from a negative value equal to the applied unregulated DC bus ($-V_B$) to an approximately equal but positive value ($+V_B$). Since the cathodes of the main SCR 36 and the commutating SCR 44 are at the same potential, the commutating SCR is reverse biased at time $T_1$ of the FIG. 2C waveform into the off or nonconducting mode, and the freewheeling diode 48 at time $T_1$ of the FIG. 2D waveform is similarly driven into a nonconducting mode. The main SCR 36 continues to supply load current in the regulated DC output of the chopper circuit 10 of FIG. 1. After capacitor 42 reaches the voltage level of approximately $+2V_B$, it holds at this voltage level as indicated by portion 50 of the waveform of FIG. 2B for a determinable or selected period of time. At time $T_2$, regulator 22 of FIG. 1 signals for a turn on of the commutating SCR 44 and it goes to zero voltage potential in its conducting mode as shown by FIG. 2C. When commutating SCR 44 is fired at time $T_2$, the voltage on capacitor 42 is applied across the bus and the capacitor discharges in a linear manner as indicated by slope portion 52 of the FIG. 2B waveform. Capacitor 42 will discharge at a rate proportional to the current which is a basic characteristic of a capacitor. This discharge of capacitor 42 places a reverse voltage on the main SCR 36 as indicated by slope portion 54 of the FIG. 2A waveform. In accordance with the equations set forth hereinbefore, main SCR 36 is reverse biased into a nonconducting mode by the application of reverse voltage for at least a minimum length of time $t_{rev}$ that is selected to be equal to or greater than $t_q$. Main SCR is turned off and returns to the applied positive electrical potential ($+V_B$) at time $T_3$. As the capacitor 42 discharges along slope portion 52, it starts to go through zero voltage but is suitably clamped at zero volts. This results in forward biasing the freewheeling diode 48 and it starts conducting so that the current that was established while the main SCR 36 was on continues to freewheel until time $T_4$. Time $T_4$ is equivalent to time $T_1$ and the process repeats at a repetition rate controlled by regulator 22.

Figure 3:
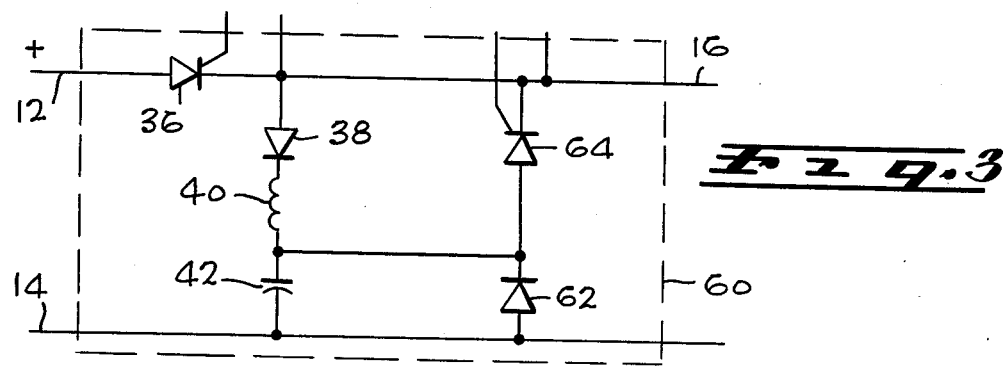
FIG. 3 is a schematic diagram of another DC-to-DC chopper circuit of the invention.

Another chopper circuit 60 of the invention is shown by FIG. 3. This chopper circuit 60 differs from the chopper circuit 10 of FIG. 1 in that a freewheeling diode 62 is electrically connected in series with the anode of a commutating SCR 64; whereas in the chopper circuit 10, the freewheeling diode 48 is connected in parallel with the commutating SCR 44. It is essential, however, that the cathodes of the main and commutating SCRs are at the same potential and that the applied voltage is delivered as an unregulated bus voltage.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

We claim:

1. A DC-to-DC chopper circuit responsive to a regulator system and connected between a source of DC voltage having a first voltage level other than zero voltage potential and a DC output bus, the DC-to-DC chopper comprising:
    (a) first semiconductor switch means responsive to the regulator system and periodically connecting the source of DC voltage to the DC output bus,
    (b) resonating circuit means responsive to said first semiconductor switch means applying the DC voltage at the first voltage level, said resonating circuit means increasing the DC voltage from the first voltage level to a determinable second voltage level,
    (c) second semiconductor switch means responsive to the regulator system and periodically connecting said resonating circuit means at said second voltage level to the DC output bus so that the electrical continuity of said first semiconductor switch means is interrupted and said second voltage level decreases to the zero voltage potential, and
    (d) means electrically connected in series with said second semiconductor switch means, said last-named means responsive to said resonating circuit means reaching said zero voltage potential establishing a freewheeling current in the output bus continuing until the electrical continuity of said second semiconductor switch means and said last-named means are interrupted by the next periodic cycle of said first semiconductor switch means.

2. The DC-to-DC chopper circuit of claim 1 in which said first and second semiconductor switch means are first and second SCRs periodically gated on by the regulator system which includes at least one firing circuit.

3. The DC-to-DC chopper circuit of claim 2 in which the cathodes of said first and second SCRs are at the same electrical potential.

4. The DC-to-DC chopper circuit of claim 1 in which said resonating circuit includes series connected diode, inductor, and capacitor electrically connected across the source of DC voltage in series with said first switch means.

5. The DC-to-DC chopper circuit of claim 4 in which said second switch means is electrically connected intermediate said inductor and capacitor between said resonating circuit and the DC output bus.

6. The DC-to-DC chopper circuit of claim 3 in which said last-named means is a freewheeling diode.

7. The DC-to-DC chopper circuit of claim 1 in which the time for said second voltage level to decrease to the zero voltage potential is at least equal to the determinable time $t_{rev}$ required to interrupt the electrical continuity of said first switch means.

* * * * *